United States Patent [19]
Inaniwa et al.

[11] Patent Number: 5,365,810
[45] Date of Patent: Nov. 22, 1994

[54] SCREW SUPPLY CONTROL APPARATUS FOR SCREW TIGHTENING ROBOT

[75] Inventors: Masahiro Inaniwa; Yoshiaki Sato, both of Katsuta, Japan

[73] Assignee: Hitachi Koki Co., Ltd., Tokyo, Japan

[21] Appl. No.: 99,540

[22] Filed: Jul. 30, 1993

[51] Int. Cl.$^5$ ............................................. B25B 23/04
[52] U.S. Cl. ........................................ 81/430; 81/57.37
[58] Field of Search ................ 81/57.37, 430–433, 81/435; 227/112; 221/278

[56] References Cited

U.S. PATENT DOCUMENTS

| | | | |
|---|---|---|---|
| 3,648,744 | 3/1972 | Bangerter | 81/430 |
| 4,333,367 | 6/1982 | Taffer | 81/430 |
| 4,672,866 | 6/1987 | Riera et al. | 81/430 X |
| 4,776,242 | 10/1988 | Poux et al. | 81/57.37 |

*Primary Examiner*—D. S. Meislin
*Attorney, Agent, or Firm*—Sughrue, Mion, Zinn, Macpeak & Seas

[57] ABSTRACT

A screw supply control apparatus controls screw-feed operations of a screw feeder which sequentially supplies to a robot a plurality of screws. The apparatus includes a screw feeder having a screw air-feed pipe through which the screws are air-fed to the robot, and an air-feed valve provided to the screw air-feed pipe. Compressed air is fed into the screw air-feed pipe to air-feed the screw when the screw air-feed valve is open whereas compressed air is not fed into the screw air-feed pipe when the screw air-feed valve is closed. A screw passage sensor is provided at the screw air-feed pipe for sensing passage of the screw and produces a passage signal when the passage of the screw is sensed. A monostable multivibrator is provided for measuring a predetermined period of time and produces a time-up signal when the predetermined period of time is measured. A control unit controls the air-feed valve to open in response to the passage signal and then to close the air-feed valve in response to the time-up signal wherein the monostable multivibrator is controlled to start measurement of the predetermined period of time when the screw passage sensor produces the passage signal.

13 Claims, 17 Drawing Sheets

SCREW SUPPLY CONTROL APPARATUS FOR SCREW TIGHTENING ROBOT

BACKGROUND OF THE INVENTION

1. Field of the Invention

The present invention relates to a screw supply control apparatus for use in conjunction with a screw tightening robot, and more particularly to a screw supply control apparatus for controlling supplying screws from a screw air feeder to the screw tightening robot by way of a screw air-feed pipe.

2. Description of the Related Art

There has been known a problem with conventional screw supply control apparatuses in that screwing-in units installed in screw tightening robots and screw air feeders have been poorly coordinated in terms of screw supplying and screw tightening operations, so that screws easily become stopped up in the screw feeders. Another problem has been known in that long tact times unnecessarily limit speeds of screwing-in operations.

SUMMARY OF THE INVENTION

It is therefore an object of the present invention to overcome the above-described drawbacks, and to provide a screw supply control apparatus that can supply screws reliably and allow high speed screw tightening.

To achieve the above and other objects, the present invention provides a screw supply control apparatus for sequentially supplying to a robot a plurality of screws. The apparatus includes a screw feeder having a screw air-feed pipe through which the screws are air-fed to the robot, and an air-feed valve provided to the screw air-feed pipe. Compressed air is fed into the screw air-feed pipe to air-feed the screw when the screw air-feed valve is open whereas compressed air is not fed into the screw air-feed pipe when the screw air-feed valve is closed. A screw passage sensor is provided at the screw air-feed pipe for sensing passage of the screw and produces a passage signal when the passage of the screw is sensed. Time measuring means is provided for measuring a first predetermined period of time and produces a time-up signal when the first predetermined period of time is measured. Control means controls the air-feed valve to open in response to the passage signal and then to close the air-feed valve in response to the time-up signal wherein the time measuring means is controlled to start measurement of the first predetermined period of time when the screw passage sensor produces the passage signal.

Status checking means may further be provided for checking an operational status of the air-feed valve and selectively producing an open signal indicative of opening of the air-feed valve and a close signal indicative of close of the air-feed valve. Retry means is provided for performing a screw air-feed retry operation by opening the air-feed valve for a second predetermined period of time in the absence of the passage signal and when the status checking means produces the close signal.

Counting means may further be provided for counting a number of the screw air-feed retry operations performed. The retry means repeats the screw air-feed retry operations until a count number in the counting means reaches a predetermined value.

BRIEF DESCRIPTION OF THE DRAWINGS

The above and other objects, features and advantages of the invention will become more apparent from reading the following description of the preferred embodiments taken in connection with the accompanying drawings, in which.

DETAILED DESCRIPTION OF THE PREFERRED EMBODIMENTS

Figure 1:
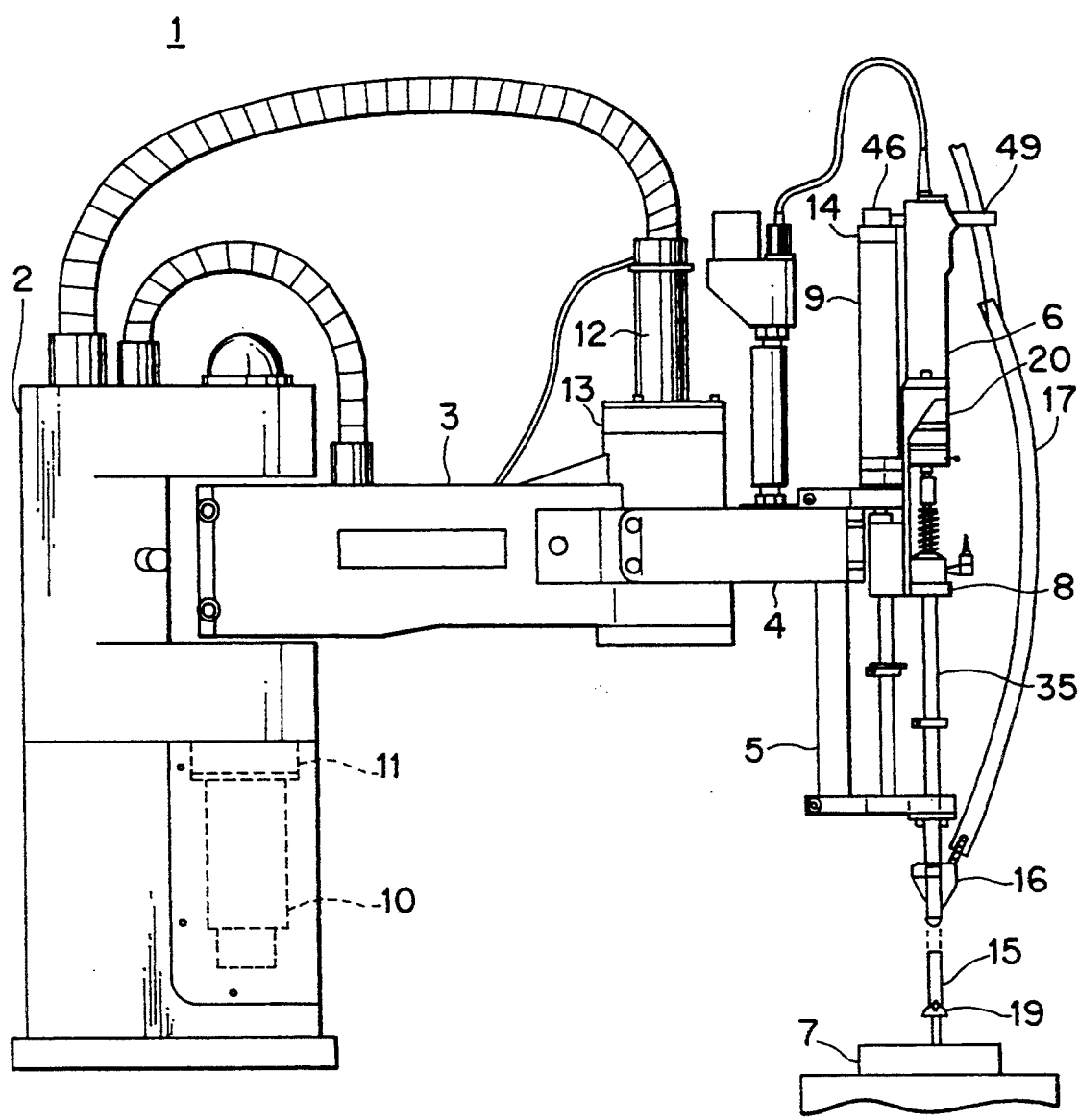
FIG. 1 is a front view showing a screw tightening robot used in the preferred embodiments of the present invention.

Referring to the accompanying drawings, various preferred embodiments of the present invention will be described in detail, wherein like parts and components are designated by the same reference numerals to avoid duplicating description.

Figure 2:
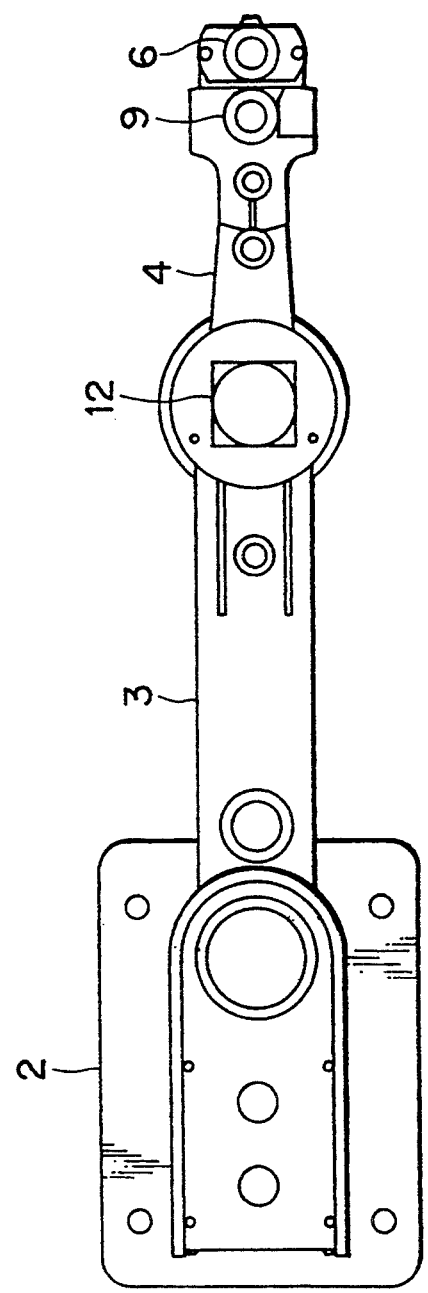
FIG. 2 is a top plan view showing the screw tightening robot shown in FIG. 1.

FIG. 1 is a front view and FIG. 2 is a top plan view showing a screw tightening robot 1 to be used in conjunction with a screw supply control apparatus according to the present invention. The robot 1 has a main block 2 to which a first arm 3 is connected. The first arm 3 is horizontally pivotally movable about a shaft supported by the main block 2 by virtue of a first arm servo motor 10 and a first gear box 11 both accommodated in a shaft housing of the first arm 3. To the tip of the first arm 3 is connected a second arm 4 that is also horizontally pivotally movable about a shaft at the tip of the first arm 3 by virtue of a second arm servo motor 12 and a second gear box 13 both accommodated in a shaft housing of the second arm 4.

To the tip of the second arm 4 is fixedly secured a screw tightening head 5 on which a slide unit 8 is vertically slidably supported. To the slide unit 8 is fixedly connected a housing of a screw driver 6 that has a rotatable drive shaft extending downwardly through the slide unit 8 and a pipe 35. A drive bit 15 is attached to the lower end of the drive shaft of the screw driver 6. Therefore, the drive bit 15 is vertically movable with the slide unit 8 and is rotatable about its own axis. The screw driver 6 is provided with a torque limiter 20 which issues a torque signal 21 (to be described later with reference to FIG. 9) when the driving torque imparted on the screw 19 by the drive bit 15 reaches a predetermined value.

A pneumatic cylinder 9 is mounted on the head 5. The pneumatic cylinder 9 has a pair of valves 14 (the counterpart thereof being not depicted in the figure), the vertically movable piston, and two chambers separated by the piston. One of the valves 14 is positioned above the pneumatic cylinder 9 is in fluid communication with the upper chamber. The other valve 14 is positioned at the lower end of the pneumatic cylinder 9 and is in fluid communication with the lower chamber. The slide unit 8 is lowered by opening the lower valve 14 to discharge the compressed air confined in the lower chamber, closing the lower valve 14, then opening the upper valve 14 to introduce the compressed air into the upper chamber, and then closing the upper valve 14. Similarly, the slide unit 8 is raised by opening the upper valve 14 to discharge the compressed air confined in the upper chamber, closing the upper valve 14, opening the lower valve 14 to introduce the compressed air into the lower chamber, and then closing the lower valve 14. The slide unit 8 is connected to the piston of the pneumatic cylinder 9 and so rises and lowers, moving away from and toward a workpiece 7, as the piston rises and lowers. A limit sensor 46 detects that the slide unit 8 has reached the upper dead point and issues a detection signal to a control unit 22 to be described later to thereby control opening and closing of the valves 14.

A Y-shaped screw holder 16 is provided in the passageway of the drive bit 15. The holder 16 has a first prong through which the drive bit 15 passes to pick up the screw 19 staying at the first prong, and a second prong connected to an air-feed pipe 17 through which screws 19 are supplied from a screw feeder 18 shown in FIG. 3. Under the holder 16 is disposed the workpiece 7.

In operation, pivotal movements of the first arm 3 and the second arm 4 guide the screw driver 6 to positions directly above where screws 19 are to be driven into the workpiece 7, whereat the screw driver 6 rotates the drive bit 15. Simultaneously, the operation of the pneumatic cylinder 9 causes the slide unit 8 to move downward toward the workpiece 7. Before the drive bit 15 passes through the screw holder 16, a screw 19 is supplied to the screw holder 16 from the screw air-feed pipe 17. As the drive bit 15 moves toward the workpiece 7, it passes through the first prong, and out the trunk of the screw holder 16. As the drive bit 15 passes through the screw holder 16, the drive bit 15 receives the screw 19 and screws it into the workpiece 7.

When the head of the screw 19 meets the face of the workpiece 7, torque required by the screw driver 6 to drive the drive bit 15 increases greatly. When torque reaches the predetermined value, the torque limiter 20 issues the torque signal 21 to the control unit 22 shown in FIG. 9. In response to the torque signal 21, the control device 22 stops the rotations of the screw driver 6 and regulates the valves 14 to cause the piston of the cylinder 9 to move upward. Subsequently, the slide unit 8 moves away from the workpiece 7, whereupon one screw driving operation is completed. After the slide unit 8 retreats from the screw holder 16, the screw 19 for the next screw driving operation is supplied through the air-feed pipe 17 to the screw holder 16.

Figure 3:
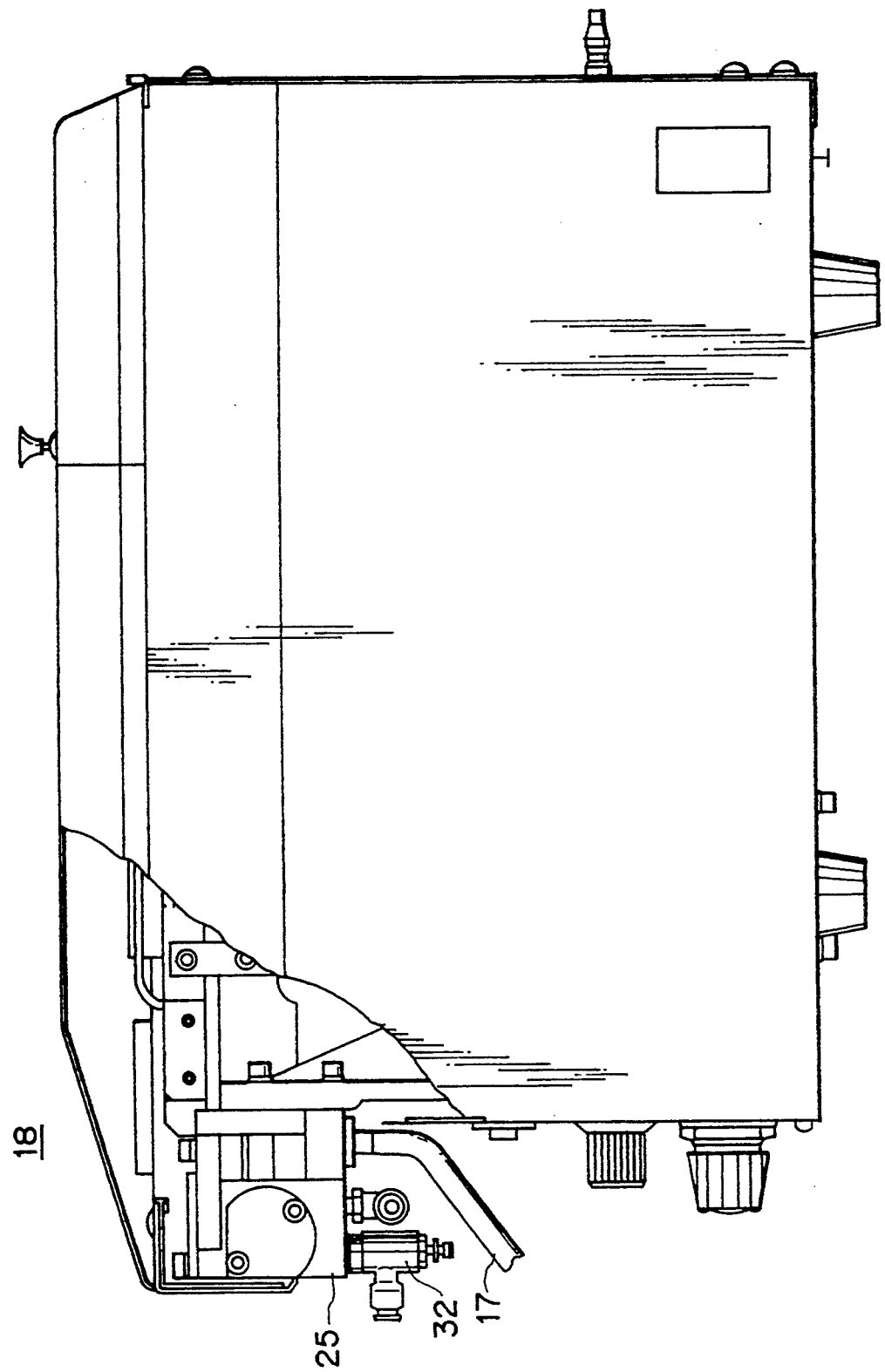
FIG. 3 is a partial cut-away front view showing a screw feeder.
Figure 4:
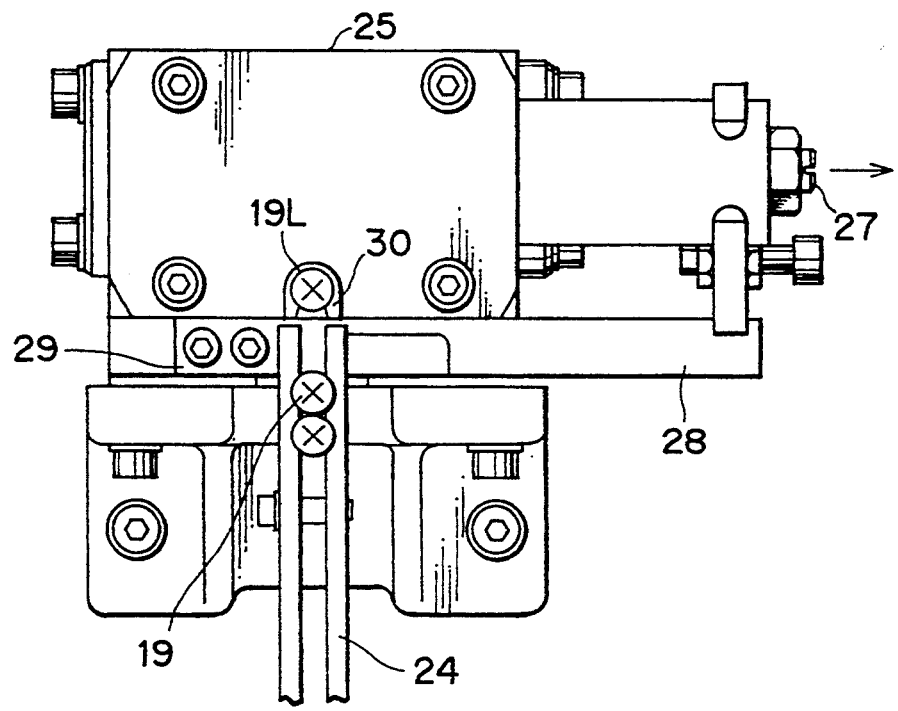
FIGS. 4 and 5 are top plan views showing positional relationships between piston, slider and screw.
Figure 5:
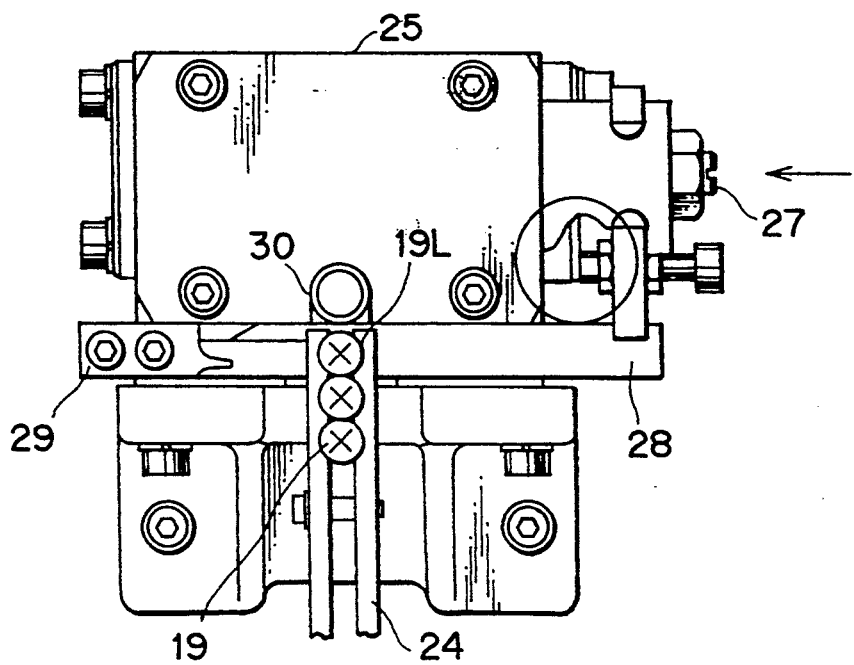

FIG. 3 is a side-external view showing the screw feeder 18 according to the present invention. The screw feeder 18 has a separator 25 and an air feed mechanism. The separator 25 separates the screws one by one and guides them into the screw air-feed pipe 17 in a manner to be described below. The screw air-feed pipe 17 connects the separator 25 to the second prong of the Y-shaped screw holder 16. The air feed mechanism includes a piston 27, which is shown in FIGS. 4 and 5, and an air-feed valve 36 (see, for example, FIG. 9). The piston 27 is reciprocal with forward and backward movements in accordance with a compressed air supplied through the air-feed valve 36 and moves into and out of the separator 25.

Figure 6:
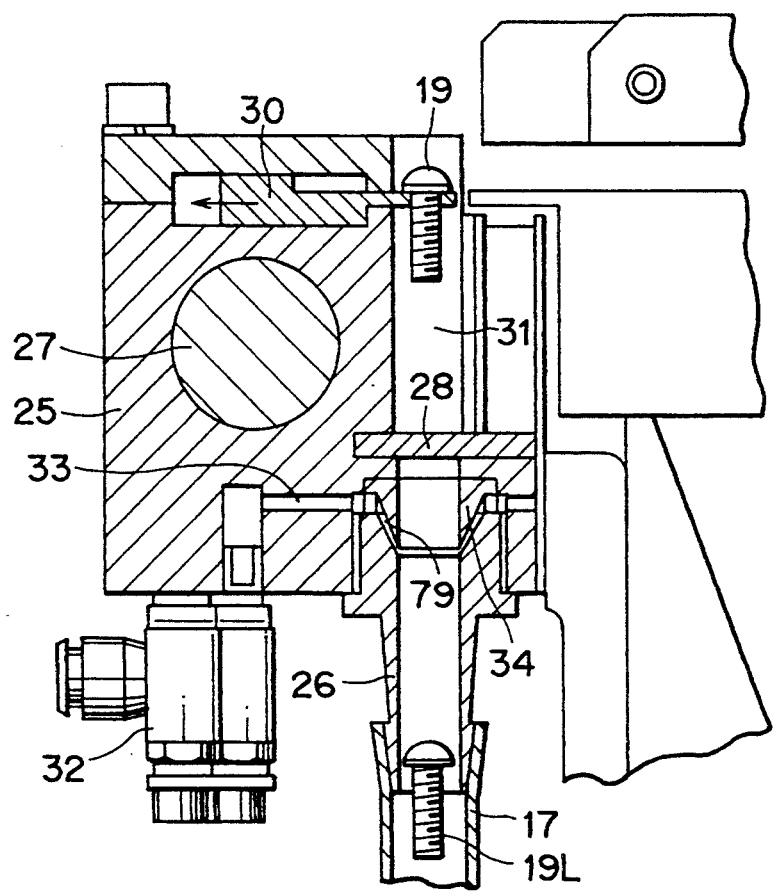
FIGS. 6 and 7 are partial cross-sectional views showing positional relationships between the piston, slider and screw.
Figure 7:
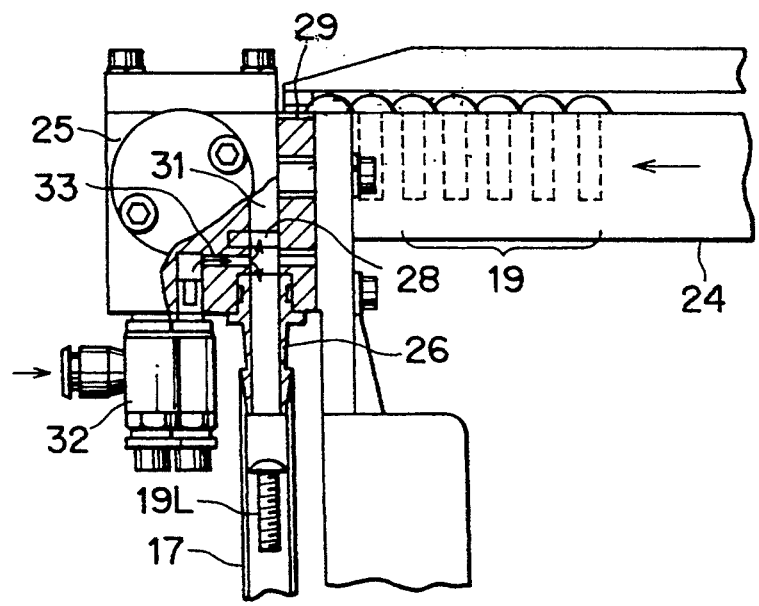

FIGS. 4 through 7 are detailed drawings showing the separator 25. FIG. 4 is a top plan view showing the separator 25 when the piston 27 is "OUT." FIG. 5 is also a top plan view showing the separator 25 when the piston 27 is "IN." FIG. 6 is a fragmentary side view showing the separator 25 when the piston 27 is "OUT." FIG. 7 is also a fragmentary side view showing the separator 25 when the piston 27 is "IN". As shown in FIGS. 4 and 5, to the separator 25 is installed a chute 24 formed by two ramps that vibrate. Between the two ramps of the chute 24 dangle a row of screws 19. The screws 19 advance along the chute 24 toward a U-shaped head guide 30 due to vibrations of the two ramps.

A plate 29 is fixedly secured to a slider 28 which in turn is connected to the piston 27, so that the slider 28 and the plate 29 move with the piston 27. When the piston 27 moves out of the separator 25 or rightwardly as shown in FIG. 4, the corresponding movement of the plate 29 separates the lead screw 19L from the row of screws 19 and guides the lead screw 19L to the opening of the head guide 30. The dangling screw at the head guide 30 is released by the movement of the piston 27 into the separator 25 or leftward movement of the piston 27 as shown in FIG. 5, so that the lead screw 19L free-falls through the passage opening 31 and a hose connector 26 and then into the air-feed pipe 17 as shown in FIG. 6. After the screw 19L has reached the air-feed pipe 17, the slider 28 isolates the passage opening 31 from the hose connector 26.

Surfaces of the hose connector 26 and the connector piece 34 form a nozzle 79 from which is ejected compressed air fed through a volume adjuster 32 and a side passage 33. Compressed air is introduced into the adjuster 32 when the piston 27 moves out of the separator 25 at which the air-feed valve 36 is open. Compressed air, in volume adjusted by the adjuster 32 passes through the side passage 33 and the outer peripheral groove of the hose connector 26, and is ejected from the nozzle 79. Because passage of the compressed air to the passage opening 31 is blocked by the slider 28, the compressed air rushes through the hose connector 26 behind the free-falling screw 19L, sending the free-falling screw 19L to the screw holder 16.

Figure 8:
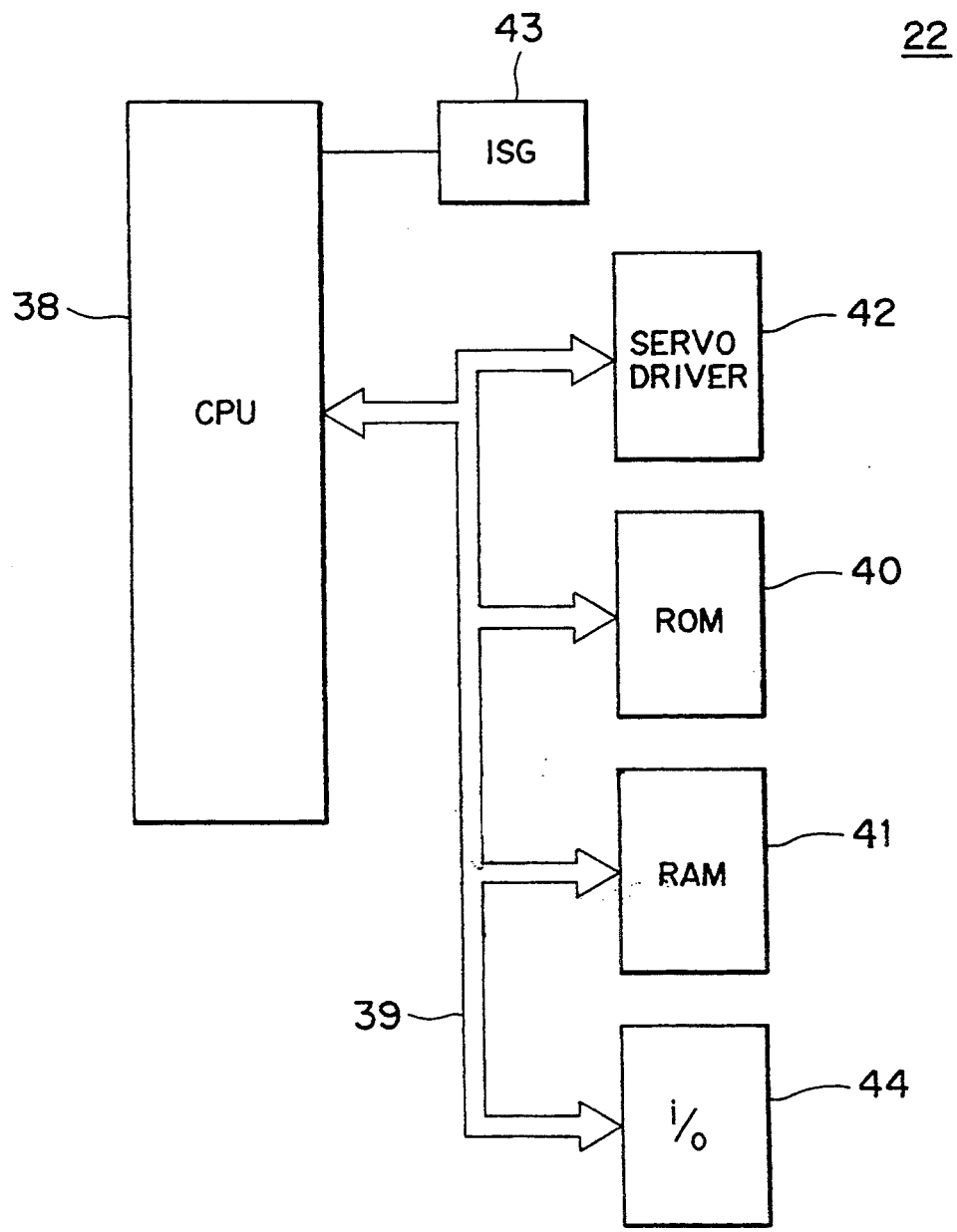
FIG. 8 is a block diagram showing a controller used in the present invention.

FIG. 8 is a block diagram representing the control unit 22 for controlling the robot 1 and the screw feeder 18. A bus line 39 including address bus, data bus, and control signal lines connects a CPU 38 to a servo driver 42, a ROM 40, a RAM 41 and an input/output (i/o) port 44. The ROM 40 stores a screw supply control program, a robot control program, an interrupt program to be described later in the form of a flowchart. The RAM 41 stores teaching data for the robot 1 and is used as a work register. The servo driver 42 controls the servo motors 10 and 12 in accordance with commands from the CPU 38 to perform the positional control of the first arm 3 and the second arm 4. An interruption signal generator (ISG) 43 is connected directly to the CPU 38 and sends interrupt signals thereto at a predetermined interval so that the CPU 38 executes the interrupt program in response thereto. The i/o port 44 is for interfacing the various components required for implementing the screw supply control.

Figure 9:
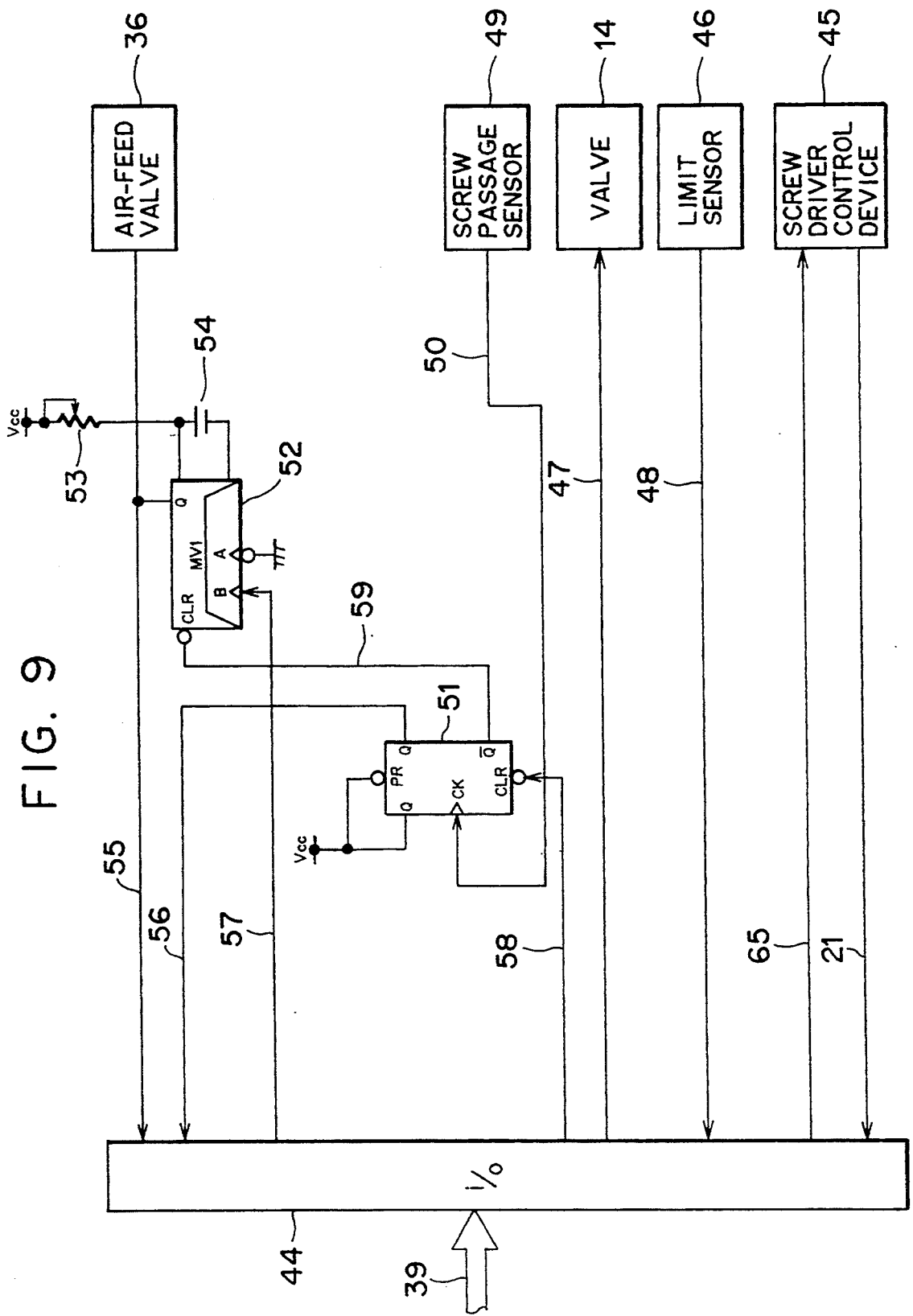
FIG. 9 is a block diagram showing a circuit arrangement of the screw supply control apparatus according to a first embodiment of the present invention.

FIG. 9 is a block diagram showing a screw supply control circuit according to a first embodiment of the present invention. A screw driver control device 45 receives a drive command signal through an output line 65 of the i/o port 44 and drives the screw driver 6. When the head of the screw 19 meets the surface of the workpiece 7 and the torque limiter 20 detects that torque required to rotate the bit 15 exceeds the predetermined value, the screw driver control device 45 sends a torque signal through an input line 21 to the i/o port 44. A command signal fed through an output line 47 of the i/o port 44 drives the valve 14 so that the slide 10 unit 8 rises or lowers. The limit sensor 46 sends the detection signal to the i/o port 44 through an input line 48 when the slide unit 8 has reached the upper dead point. A screw passage sensor 49 is provided in the air-feed pipe 17 close to the second prong of the Y-shaped screw holder 16. When the screw 19 passes by the screw passage sensor 49, the screw passage sensor 49 sends a screw detection signal through a signal line 50 to the clock (CK) terminal of a D-type flip-flop (FF) 51. Because the D terminal of the flip-flop 51 is being powered, the flip-flop 51 is triggered in response to the screw detection signal. A signal line 56 connects the Q output of the flip-flop 51 to the i/o port 44. A signal line 59 connects the Q bar output of the flip-flop 51 to the clear (CLR) terminal of a monostable multivibrator (MV1) 52. A clear command signal is sent to the clear (CLR) terminal of the flip-flop 51 through a signal line 58. The monostable multivibrator 52 sends a Q output through a signal line 55 to the i/o port 44. The Q output of the monostable multivibrator 52 is also connected to the air-feed valve 36 which opens for a predetermined period of time when the Q output of the monostable multivibrator 52 is at "1". Trigger signals are applied to the B terminal of the monostable multivibrator 52 through a trigger input line 57 to trigger the same.

Figure 10:
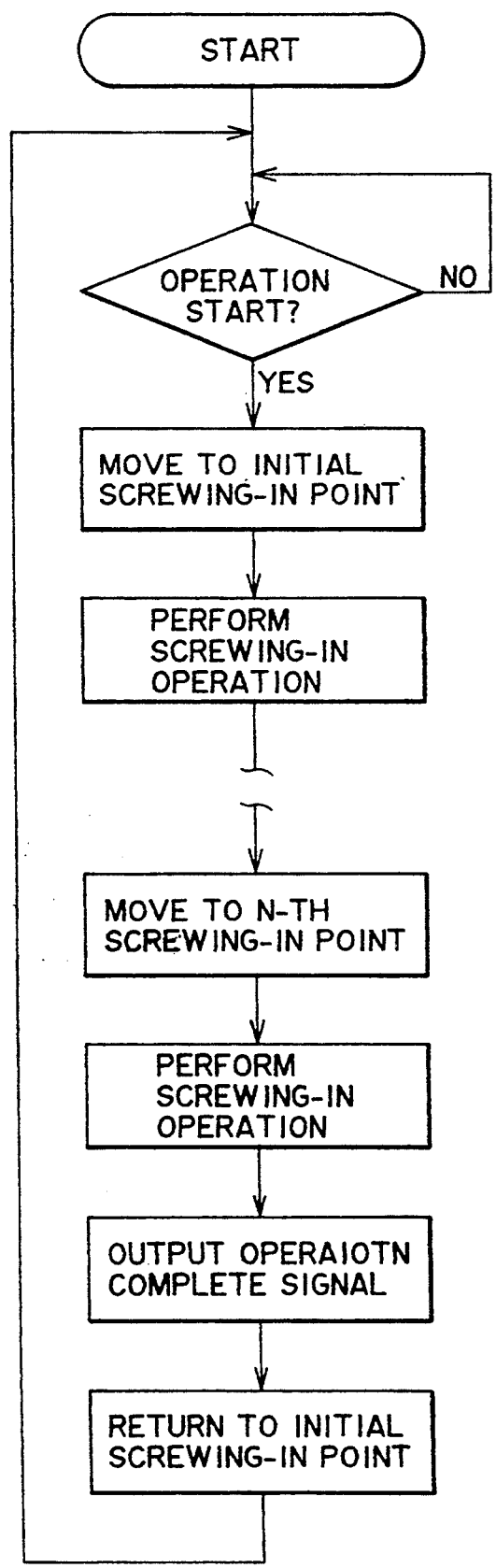
FIG. 10 is a flow chart for describing basic operations performed by a robot.

FIG. 10 is a flowchart representing the basic operations of the robot 1. When an operation start signal is input to the robot 1, the CPU 38 moves the head 5 to an initial screwing-in point where a first screwing-in operation is perform in accordance with the programs stored in the ROM 40 and the teaching data stored in the RAM 41. Upon completion of the first screwing-in operation, the head 5 is moved and screwing-in operations are performed until all screwing-in operations required for the workpiece 7 are completed, whereupon an operation complete signal is output and the robots is prepared for the next screwing-in operation by returning the head 5 to the initial screwing-in point. The robot 1 then waits for the next start signal.

Figure 11:
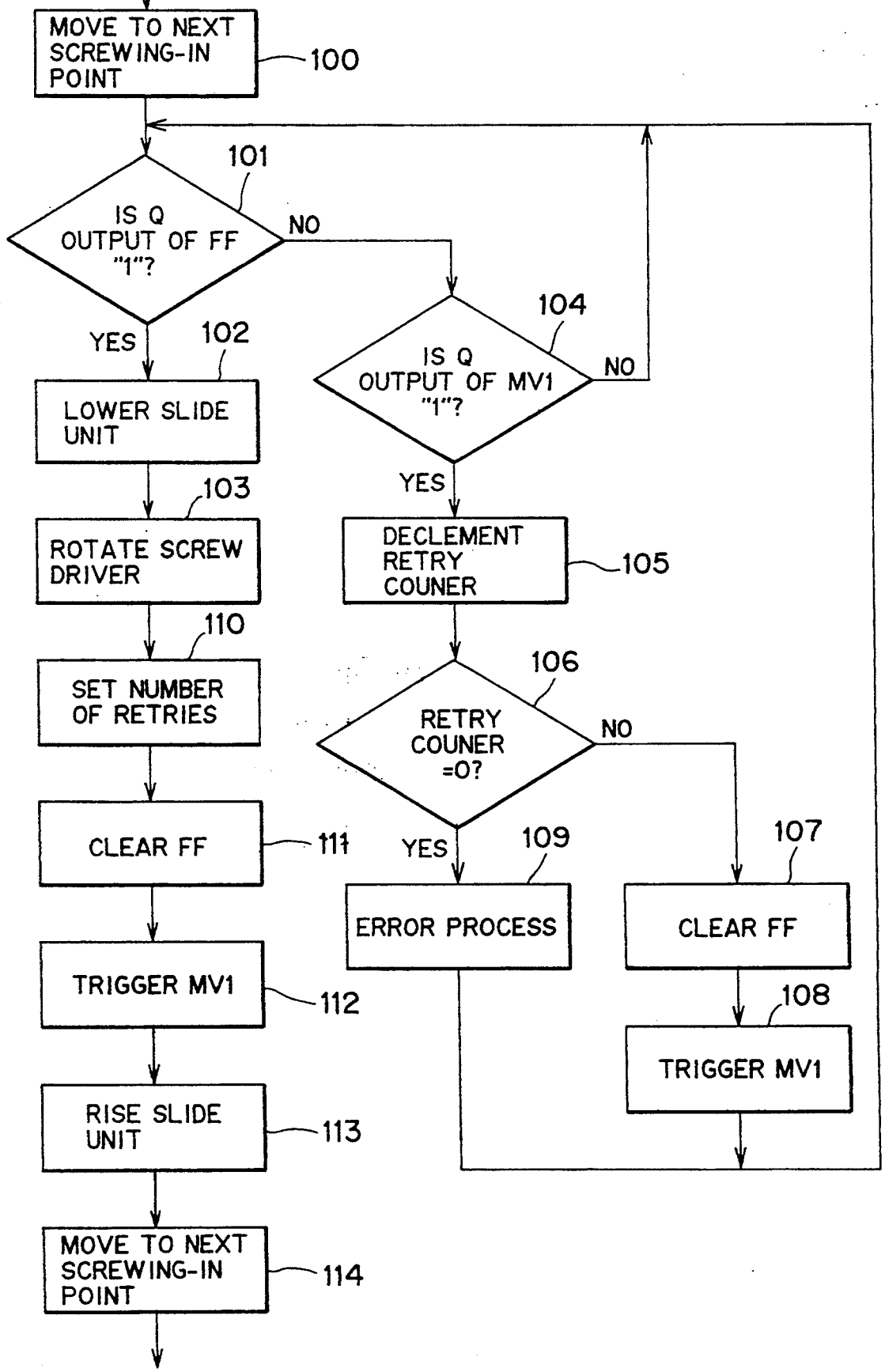
FIG. 11 is a flow chart for describing an operational sequence of the robot and a screw supply control apparatus.

FIG. 11 is a flowchart showing operations of the robot 1 and the screw supply control circuit according to the first embodiment of the present invention. After the head 5 moves to the next screwing-in point in step 100, it is determined in step 101 that a screw 19 has passed by the passage sensor 49 and is seated in the holder 16. Determination in step 101 is made based on the Q output of the flip-flop 51. If the Q output of the flip-flop 51 is "1", it is determined that the screw 19 has been supplied to the holder 16 whereas if the Q output of the flip-flop 51 is "0", it is determined that the screw 19 has not yet been supplied to the holder 16. If the determination made in step 101 is YES, then the program proceeds to step 102 where the slide unit 8 is lowered and then to step 103 where the screw driver 6 is rotated. On the other hand, if the Q output of the flip-flop 51 is "0", the program waits for the Q output of the flip-flop 51 to change to "1." When the screw 19 passes by the passage sensor 49 for supply to the holder 6 and hence the Q output of the flip-flop 51 changes to "1", the program progresses immediately to steps 102 and 103, thus conserving time and allowing high-speed screwing-in operations.

In step 104, it is determined whether or not the Q output of the monostable multivibrator 52 is "0". If affirmative, it is suggested that no screw 19 is in the holder 16 even after a screw air-feed process was completed by the opening of the air-feed valve 36 for the predetermined period of time. In this case, the program implements a screw air-feed retry operation in steps 105 through 109. In step 105, a retry counter is decremented by one. The retry counter is provided for counting the number of retry operations performed. A predetermined number has been set to the retry counter, and each time the retry operation is performed the number of the retry counter is decremented one by one. If the decision made in step 106 indicates that the number of screw air-feed retries ever performed has not reached the predetermined number, i.e., if the number in the retry counter is not "0", the screw air-feed operation is once again performed. To this effect, the clear command signal is issued from the CPU 38 via the i/o port 44 and through the signal line 58 to the clear terminal of the flip-flop 51. Further, a trigger signal is applied through the signal line 57 to the B terminal of the monostable multivibrator 52 to trigger the same, thereby opening the air-feed valve 36 for a predetermined period of time to air-feed the screw 19. If the predetermined number of screw air-feed retry operations have ever been performed, then step 109 is executed wherein a buzzer or other such signaling device goes off to alert of an error so that an operator investigate the cause of error. Upon eliminating the error, the program is reset to start from step 100.

After execution of step 103, preparations for the next screwing-in operation are made in step 110 by presetting the predetermined number in the retry counter, in step 111 by clearing the flip-flop 51 with the clear signal applied to the clear terminal of the flip-flop 51 through the signal line 58, and in step 112 by triggering the monostable multivibrator 52 with the trigger signal applied to the B terminal of the monostable multivibrator 52 through the line 57 so that the air-feed valve 36 opens for the predetermined period of time for supplying another screw 19. In step 113, the valve 14 regulates flow of compressed air so that the slide unit 8 rises until the limit sensor 46 turns on, whereupon in step 114 the head 6 moves to the next screwing-in point.

If the passage sensor 49 detects the screw 19 while the air-feed valve 36 is open, the Q output of the flip-flop 51 changes from "0" to "1". This informs the CPU 38 that the screw 19 has been supplied to the holder 16. At this time, the Q bar output of the flip-flop 51 makes complementary change from "1" to "0", thereby clearing the monostable multivibrator 52 to cause the air-feed valve 36 to close. In this manner, as soon as the passage of the screw 19 is detected, the supply of compressed air is stopped to conserve compressed air.

Figure 12:
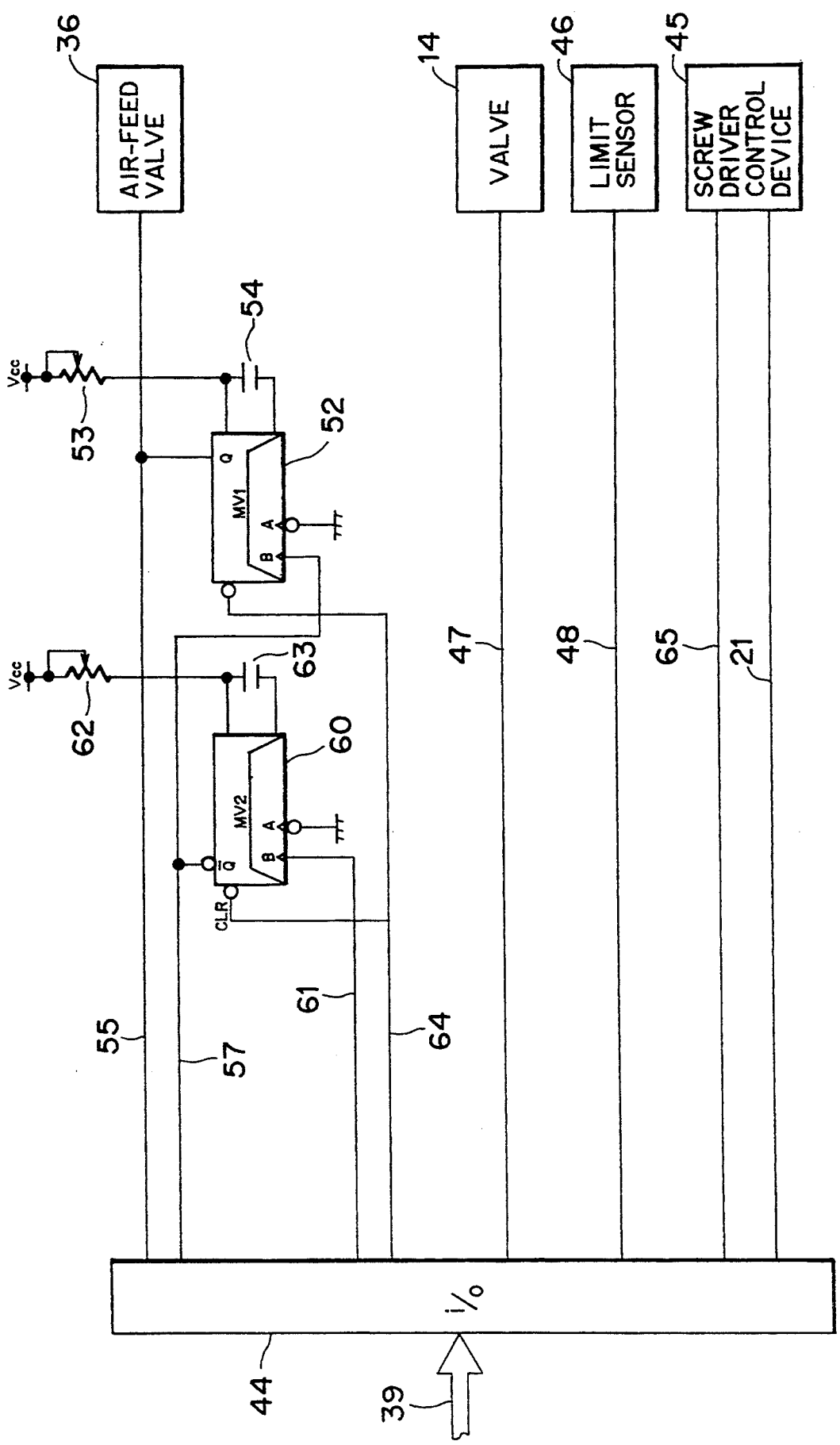
FIG. 12 is a block diagram showing a circuit arrangement of the screw supply control apparatus according to a second embodiment of the present invention.

FIG. 12 is a block diagram showing a screw supply control circuit according to a second embodiment of the present invention wherein the passage sensor 49 as used in the first embodiment is dispensed with. In the second embodiment, two monostable multivibrators 52 and 60 are provided. A signal line 64 connects the i/o port 44 with the clear terminals of the monostable multivibrators 52 and 60 to clear the same. The first monostable multivibrator (MV1) 52 is provided for controlling the air-feed valve 36 to open for a predetermined period of time when it is triggered with a trigger signal applied to the trigger or B terminal thereof through a signal line 57. The second monostable multivibrator (MV2) 60 is provided for delaying the triggering operation of the first monostable multivibrator 52 to prevent screws 19 from becoming stopped up in the holder 16. Because screws 19 may reach the holder 16 rapidly after being ejected from the feeder, screws 19 can become clogged at the holder 16 by reaching the holder 16 before the drive bit 19 retreats fully from the holder 16.

Figure 13:
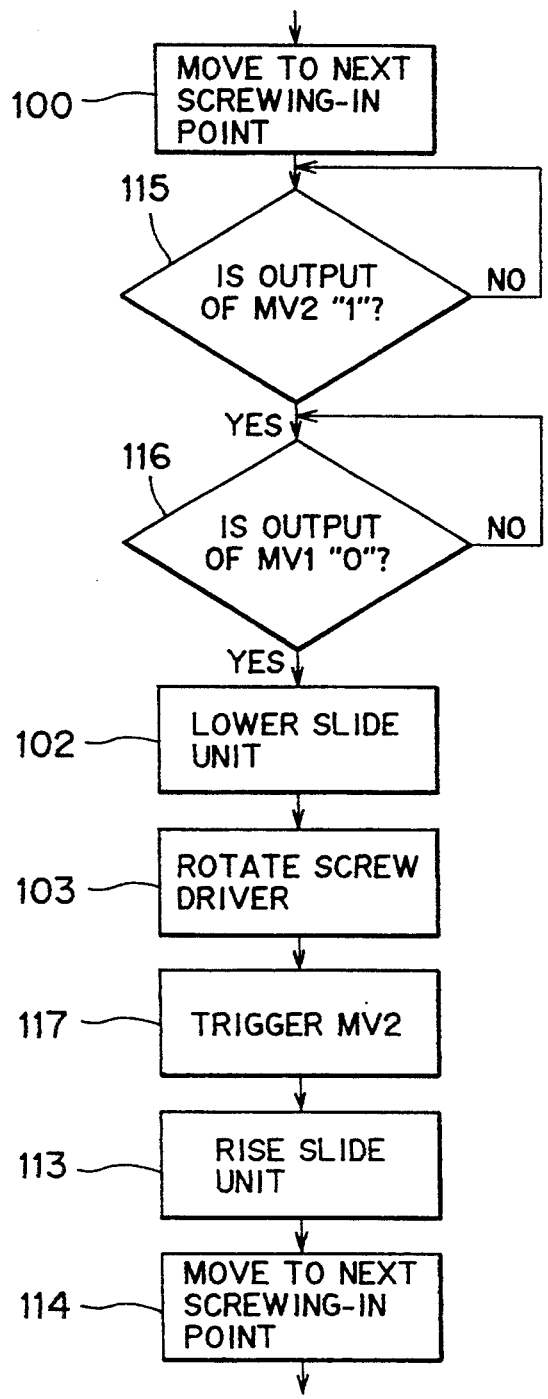
FIG. 13 is a flow chart for describing an operational sequence of the circuit shown in FIG. 12.

FIG. 13 is a flowchart showing the steps followed by the components in FIG. 12. In the flowchart of FIG. 13, the same step numbers as in FIG. 11 refer to the same processing. After step 100 is executed, it is determined in step 115 that the output of the second monostable multivibrator 60 is "1". If YES, it is further determined in step 116 that the output of the first monostable multivibrator 52 is "0". Processing executed in steps 115 and 116 are to examine if the screw air-feed operation is properly performed. More specifically, step 115 waits for the "0" output on the line 57 changes to "1" which indicates the end of the predetermined delay time. When the output of the second monostable multivibrator 60 on the line 57 changes to "1", the first monostable multivibrator 52 is triggered in response to the output of the second monostable multivibrator 60 applied to the trigger terminal or the, B terminal of the first monostable multivibrator 52. Step 116 waits for the Q output of the first monostable multivibrator 52 to change from "1" to "0" which indicates the end of a duration at which the air-feed valve 36 is open. After confirmed in steps 115 and 116 that the screw air-feed operation has been properly performed, the slide unit 8 is lowered in step 102 and thereafter the screw driver 6 is rotated in step 103. When the screwing-in operation in step 103 is completed, preparations for the next screwing-in operation are made in step 117 by issuing a trigger signal through the line 61 to triggering the second monostable multivibrator 60. In response to a change from "0" to "1" in the Q output of the second monostable multivibrator 52, the first monostable multivibrator 52 is triggered to cause the air-feed valve 36 to open for the predetermined period of time, whereby another screw 19 is supplied to the holder 16. The time delay, if unnecessary, can be made substantially zero by adjusting the resistance of a variable resistor 62 to reduce the time constant.

Figure 14:
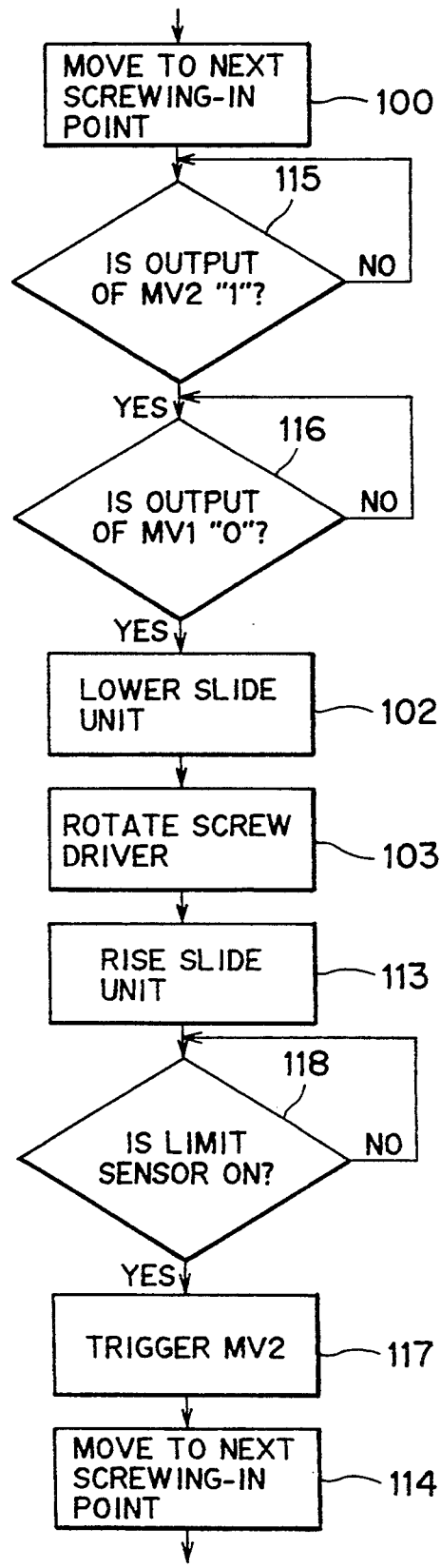
FIG. 14 is a flow chart for describing a modified operational sequence of the circuit shown in FIG. 12.

FIG. 14 is a flowchart showing another example of operations shown in the block diagram of FIG. 12. In the flowchart of FIG. 14, the same step numbers as in FIG. 13 refer to the same processing. In FIG. 14, the order of steps 117 and 113 are reversed with a step 118 added in between. After the slide unit 8 is raised in step 113, it is checked in step 118 if the limit sensor 46 is turned on. Directly after the limit sensor 46 goes on, a trigger signal is issued to the second monostable multivibrator 60 through the line 61. The drive bit 15 then returns to its initial position in step 14. Supplying screws 19 to the holder 16 after confirming in this way that the drive bit 19 has retreated completely from the holder 16 prevents screws from in the holder 16.

Figure 15:
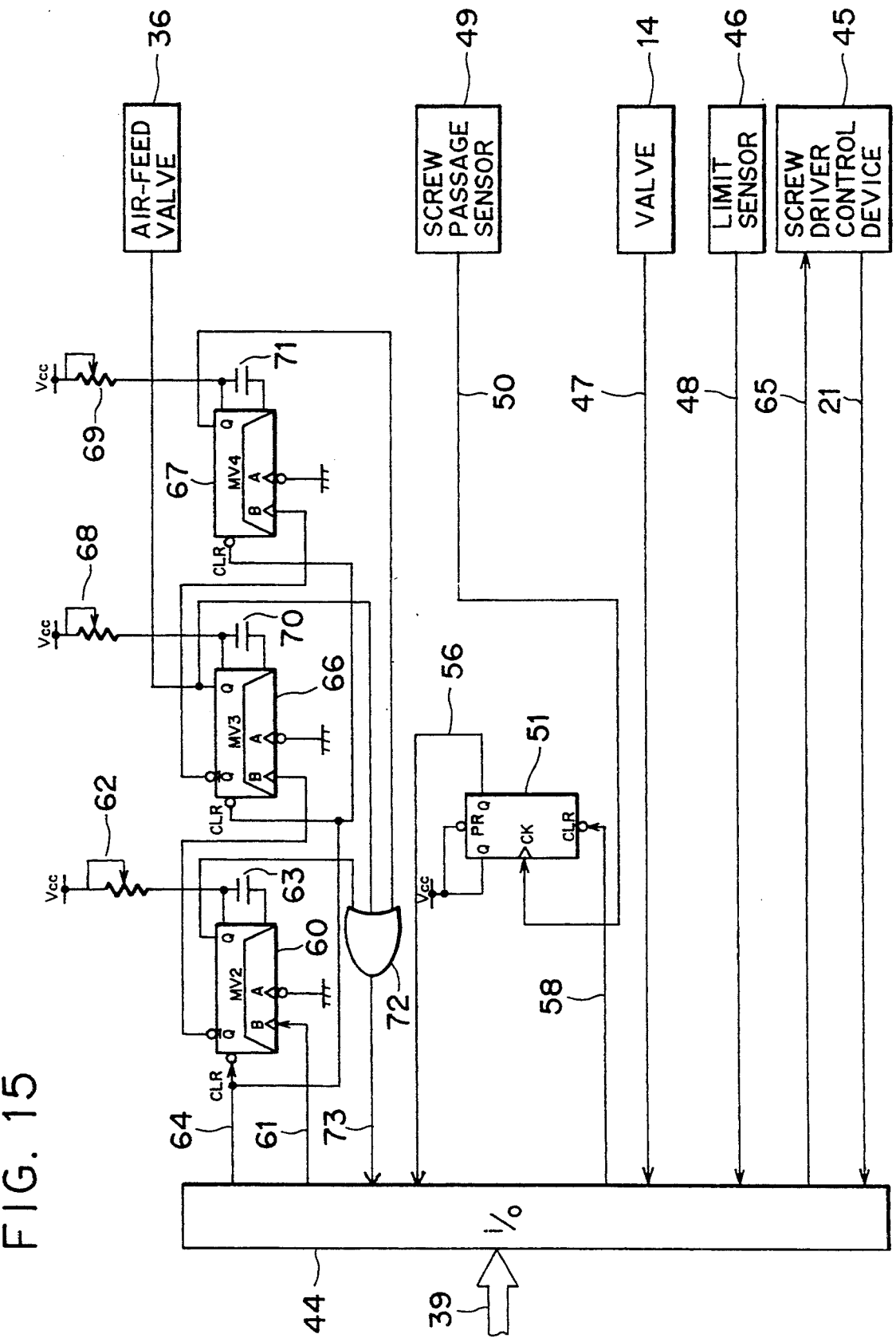
FIG. 15 is a block diagram showing a circuit arrangement of the screw supply control apparatus according to a third embodiment of the present invention.

FIG. 15 is a block diagram showing a screw supply control circuit according to a third embodiment of the present invention. The same reference numerals as those in FIGS. 9 and 12 denote the same components in FIG. 15. In the third embodiment, three monostable multivibrators 60, 66 and 67 are provided in addition to a D-type flip-flop 51. The initial stage monostable multivibrator (MV2) 60 is provided for delaying the triggering operation of the second stage monostable multivibrator (MV3) 66. The completion of the delay operation of the initial stage monostable multivibrator 60 triggers the second stage monostable multivibrator 66, the resultant signal from which directs opening of the air-feed valve 36 for a predetermined period of time. Falling edge of the signal from the second stage monostable multivibrator 66, which indicates the end of the valve open time, triggers a third stage monostable multivibrator 67, the resultant signal from which directs closing of the air-feed valve 36 after expiration of a predetermined period of time. An OR gate 72 is provided for receiving the Q outputs from these three monostable multivibrators 60, 66 and 67. The OR gate 72 applies its output to the i/o port 44 through a signal line 73.

Figure 16:
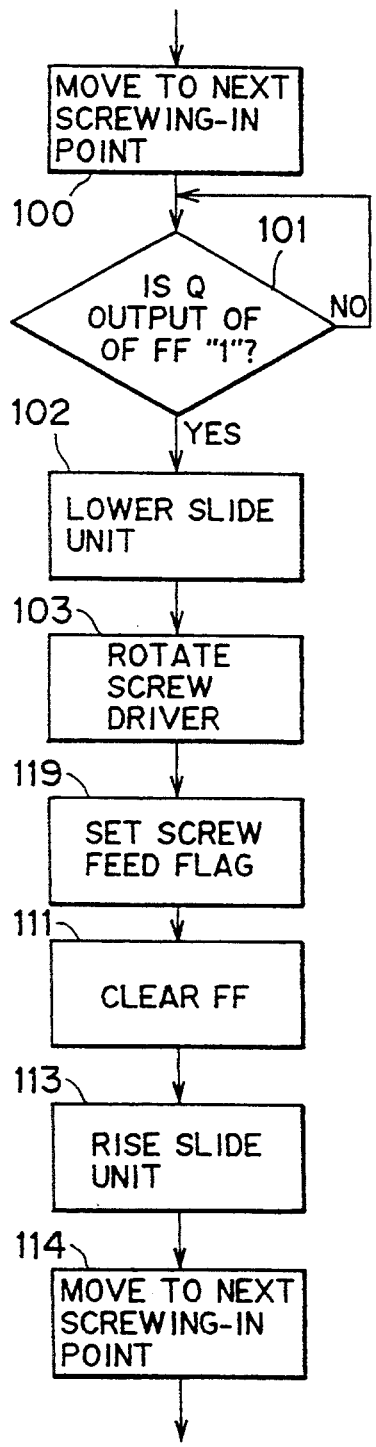
FIG. 16 is a flow chart for describing an operational sequence of the circuit shown in FIG. 15.

FIGS. 16 is a flowchart showing the operations in the block diagram shown in FIG. 15. In step 100, the head 5 has been moved to the point where the next screwing-in operation is to be performed, and in step 101 it is checked whether or not the screw 19 has passed by the passage sensor 49 and seated in the holder 16. If the screw 19 was supplied while the head 5 was brought to the next screwing-in point, the program immediately progresses to step 102 where the slide unit 8 is lowered, and then to step 103 where the screw driver 6 is rotated. On the other hand, if in step 101 a screw 19 was not supplied by the time the head 5 is brought to the next screwing-in point, that is, if the Q output of the flip-flop 51 is "0", the program waits for the Q output from the flip-flop 51 to change to "1". When the screw 19 is supplied to the holder 6 and the Q output of the flip-flop 51 changes to "1", the program progresses immediately to steps 102 and 103, thus allowing high-speed screwing-in operations by conserving time. In step 119, a screw feed flag is set. The screw feed flag indicates that the supply of the screw 19 is required for the next screwing-in operation. In step 111, the flip-flop 51 is cleared, in step 113 the slide unit 8 rises and in step 114 the head 5 is moved to the point of the next screwing-in operation.

Figure 17:
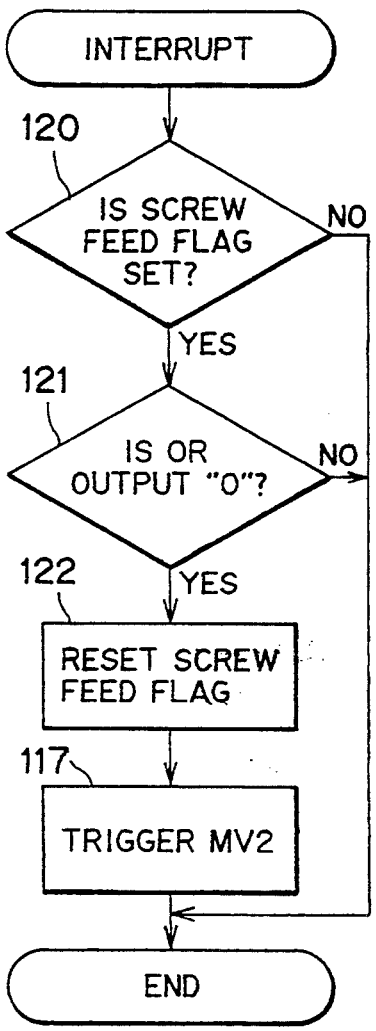
FIG. 17 is a flow chart for describing a modified operational sequence of the circuit shown in FIG. 15.

FIG. 17 is a flowchart showing an interrupt program for supply of the screw 19 for the next screwing-in operation. The interrupt program is executed at a predetermined interval. In step 120, whether or not the screw feed flag is set is determined. If set, that is, if supply of a screw is required, the statuses of the three monostable multivibrators 60, 66 and 67 are checked in step 121 based on the output of the OR gate 72. If the time measuring operations by the three monostable multivibrators 60, 66 and 67 are completed ("YES" in step 121), then in step 122 the screw feed flag is reset, after which in step 117 the initial stage monostable multivibrator 60 is triggered and the interrupt process is ended.

The time measured by the second stage monostable multivibrator 66 is for preserving a time required for the lead screw 19L to be separated by the plate 29 from the row of screws 19 and reliably transferred to the opening of the head guide 30. Even if the clock input terminal of the flip-flop 51 is applied with the output signal from the passage sensor 49, the second stage monostable multivibrator 66 is not cleared so its time measuring operation is continued. The time measured by the third stage monostable multivibrator 67 is for preserving a time required for the plate 29 to move from the leftmost position in FIG. 5 to the position where the plate 29 touches the lead screw 19L, thus preventing the slider 28 from being overtaken by-movement of the row of screws 19.

Figure 18:
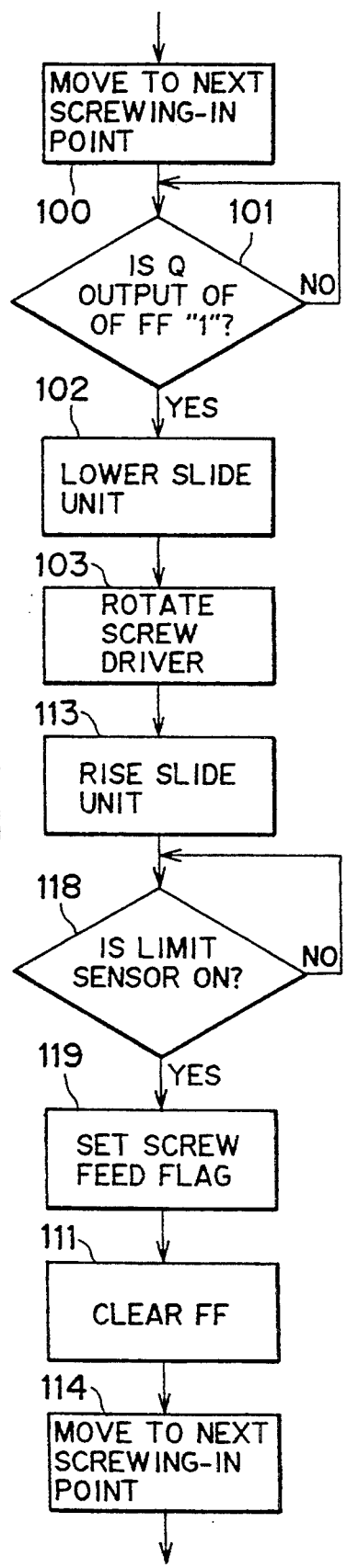
FIG. 18 is a flow chart for describing another modified operational sequence of the circuit shown in FIG. 15.

FIG. 18 is a flowchart showing another example of the operations in FIG. 16. In order to prevent the screws 19 from becoming clogged up in the holder 16 because the drive bit 15 has not yet completely retreated from the holder 16, step 119 where the screw feed flag is set, is performed after step 118 where the status of the limit sensor 46 is judged. The interrupt process shown in FIG. 17 is also applicable to the operation described in FIG. 18.

Figure 19:
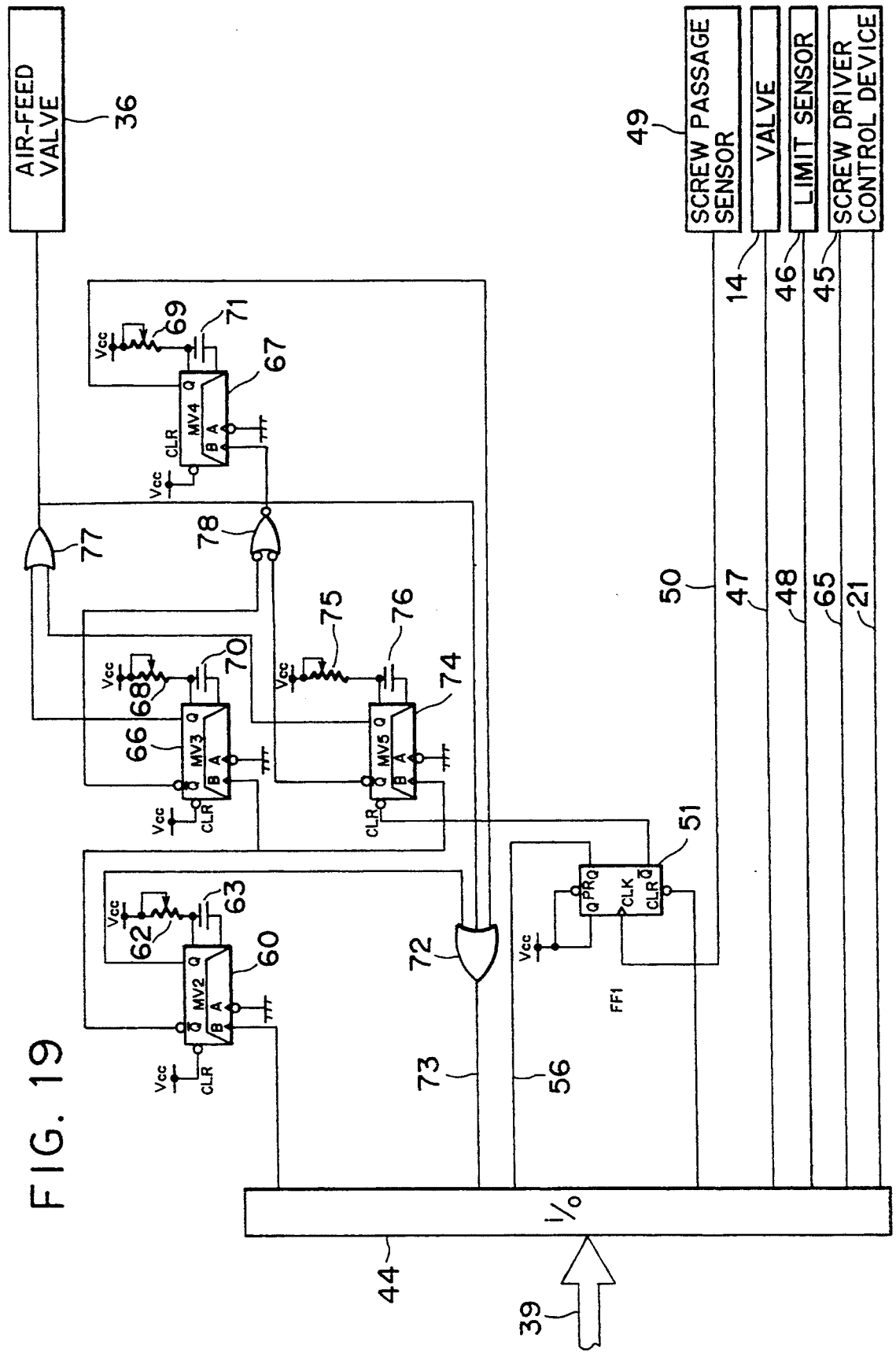
FIG. 19 is a block diagram showing a circuit arrangement of the screw supply control apparatus according to a fourth embodiment of the present invention.

FIG. 19 is a block diagram showing a screw supply control circuit according to a fourth embodiment of the present invention. The same reference numerals as those in FIG. 15 denote the same components in FIG. 19. Completion of the time delay operation of the monostable multivibrator 60 triggers a monostable multivibrator 74 and the monostable multivibrator 66 simultaneously. However, the duration of the unstable state of the monostable multivibrator 74 is longer than that of the monostable multivibrator 66. When the passage sensor 49 detects passage of the screw 19, the flip-flop 51 is triggered. When the Q output of the flip-flop 51 changes from "1" to "0", the monostable multivibrator 74 is cleared, that is, its Q output changes to "0" so that the air-feed valve 36 closes. However, if because of some trouble the passage sensor 49 does not detect the passage of a screw 19, the air-feed valve 36 will remain open for a period of time longer than prescribed by the duration of the unstable state of the monostable multivibrator 66. An OR gate 78 has two inputs applied with the Q outputs from the monostable multivibrators 66 and 74, and drives the air-feed valve 36 with the ORed output.

Figure 20:
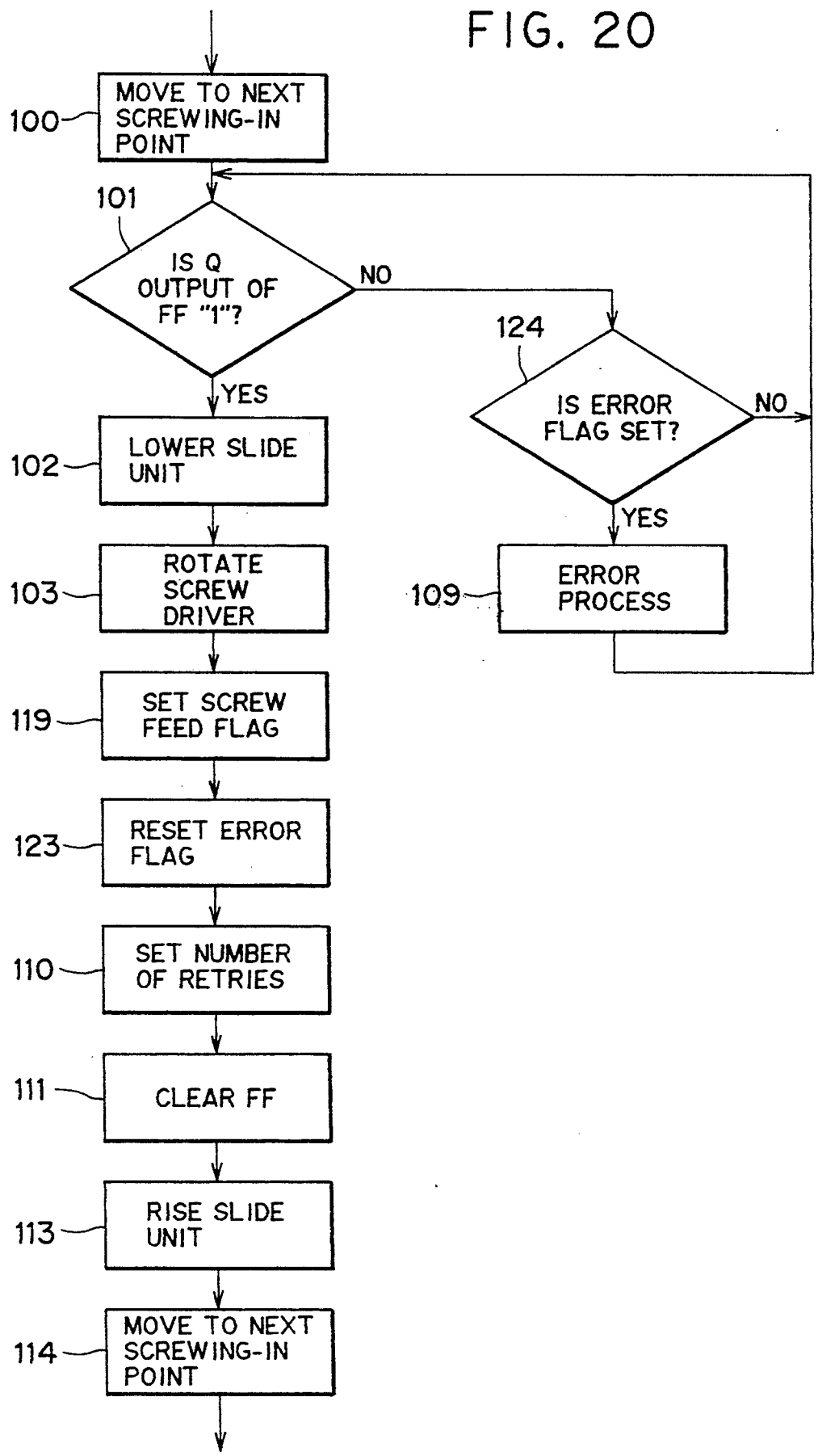
FIG. 20 is a flow chart for describing an operational sequence of the circuit shown in FIG. 19.
Figure 21:
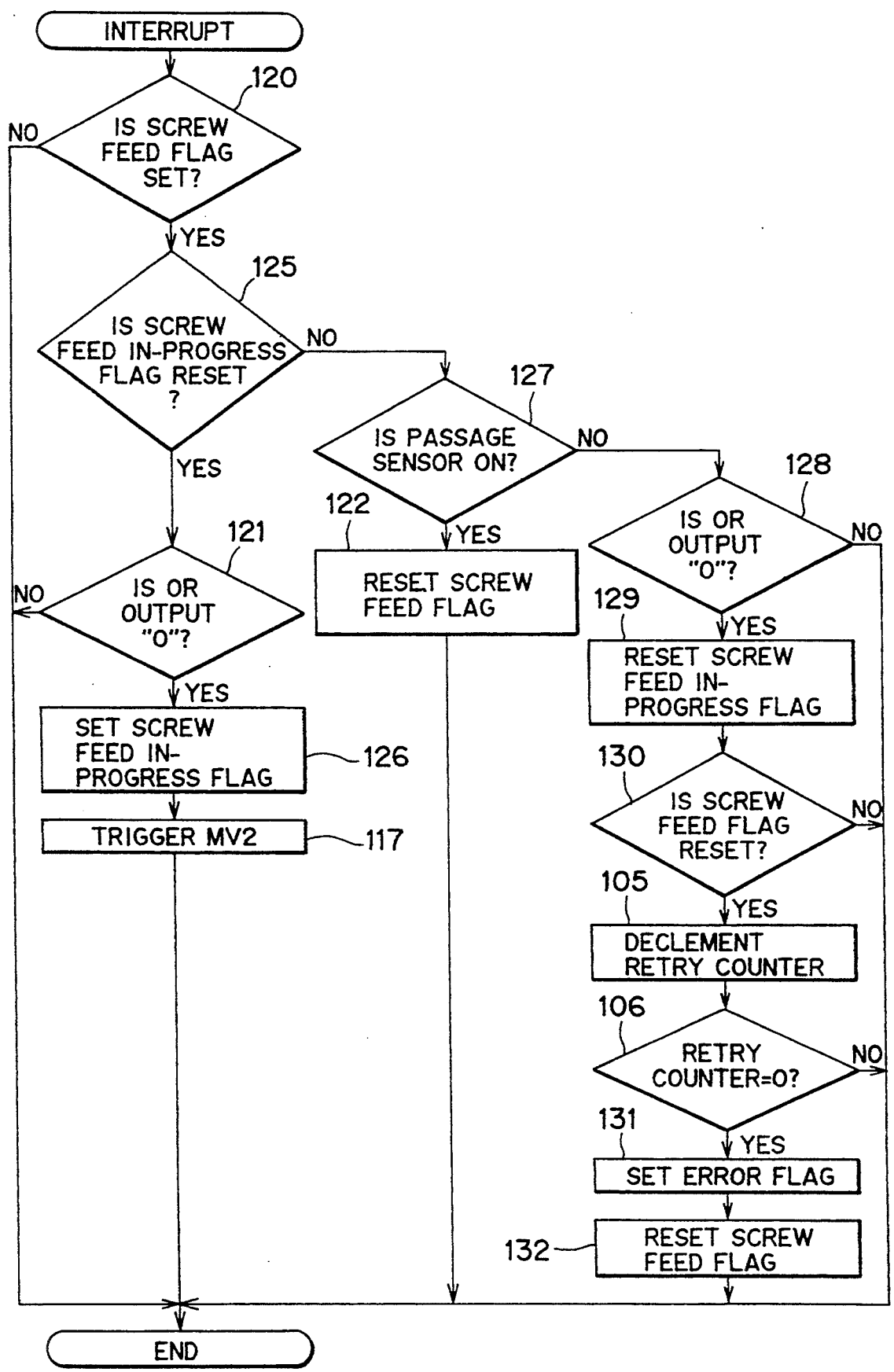
FIG. 21 is a flow chart for describing a modified operational sequence of the circuit shown in FIG. 19.

FIG. 20 is a flowchart showing the operations shown in FIG. 19 and FIG. 21 is a flowchart showing an interrupt program implemented at a predetermined interval during the process of the flowchart shown in FIG. 20. In the flowcharts of FIGS. 20 and 21, the same step numbers as in FIGS. 16 and 17 refer to the same processing. In step 100 the head 5 is moved to the point where the next screwing-in operation is performed, and in step 101 it is determined whether or not a screw 19 passed by the passage sensor 49 and is seated in the holder 16. If the screw 19 was supplied while the head 5 was moving to the next screwing-in point, the program immediately progresses to step 102 where the slide unit 8 is lowered, and then to step 103 where the screw driver 6 is rotated. On the other hand, if in step 101 the screw 19 was not supplied by the time the head 5 moves to the screwing-in point, that is, if the Q output of the flip-flop 51 is "0", it is checked in step 124 whether or not an error flag is set. If the error flag is set, then an error process is performed in step 109. The error flag is set in the interrupt program shown in FIG. 21 when the passage of the screw 19 is not detected despite a predetermined number of screw feed retry operations are performed or when the passage sensor 127 is inoperative. In the error process in step 109, the occurrence of the error is signaled with a buzzer or some other such signaling device.

After the screwing-in operation is completed in step 103, preparations are made for the next screwing-in operation. To provide information regarding request for another air-feed supply of a screw for the next screwing-in operation, the screw feed flag is set in step 119. Such information is used in the interrupt program shown in FIG. 21. In step 123 the error flag is reset, in step 110 the number of retires to be counted by the retry counter is set, and in step 111 the flip-flop 51 is cleared. Then, the slide unit 8 is raised in step 113, and the head 5 is moved to the point of the next screwing-in operation.

FIG. 21 is a flowchart showing an interrupt program. When the interrupt program is executed at the early stage of the processing in FIG. 20, the screw feed flag is set, so the determination made in step 120 results in YES. Then, the program proceeds to step 125 where it is determined whether or not a screw feed in-progress flag is reset. When the monostable multivibrators 66 and 67 are still in an unsalable state, the screw feed in-progress flag is set. Therefore, the program proceeds to step 127 where it is determined whether or not the passage sensor 49 is on. If the passage sensor 49 is not yet on, the program proceeds to step 128 where the status of the OR gate 72 is checked. If the OR gate 72 still remains at "1", i.e., NO in step 128, then the implementation of the interrupt program goes to end.

If the interrupt program is run again when all the above circumstances are the same except that the output of the OR gate 72 has changed to "0", the program proceeds to step 129 where the screw feed in-progress flag is reset. Thereafter, it is checked in step 130 whether or not the screw feed flag is reset. Because the screw feed flag has been set, i.e., NO in step 130, the interrupt program ends here.

In the next interrupt program, the screw feed in-progress flag is reset, the determination made in step 125 results in YES. Therefore, the program proceeds to step 121 where the status of the OR gate 72 is checked. If the OR gate 72 is at "0", the screw feed in-progress flag is set in step 126 and the monostable multivibrator 60 is triggered in step 127, causing to supply a screw.

If in the following run of the interrupt program, the passage sensor 49 detects a passing screw in step 127, the program proceeds to step 122 where the screw feed flag is reset. In this case, the interrupt program is set up to immediately end with the lead step 120 the next time it is run, so that no further screw supply operations are performed.

After screw supply operations have started, when the passage sensor 49 does not detect passage of a screw even if the output of the OR gate 72 changes from "1" to "0", the program proceeds from step 130 to step 105. In step 105 the number of the retry counter is decremented by one, and in step 106 it is checked whether or not the count number in the retry counter is zero. If the count number is not zero indicating that the screw feed retry can still be carried out, step 126 and step 127 are executed in the next run of the interrupt program to again execute the screw air-feed operation. However, if the number of retry counter is zero indicating that the predetermined number of retries have already achieved, the error flag is set in step 131, and the screw feed flag is reset in step 132 so that restart of screw supply operations is prohibited.

The unstable duration of the monostable multivibrator 66 is set to continue for a period of time during which the screw separated by the slide plate 29 is transferred from the chute 24 to the opening of the head guide 30. The unstable duration of the monostable multivibrator 74 is set to continue for a period of time during which the screw dripped into the air-feed pipe 17 is fed into the holder 16.

Figure 22:
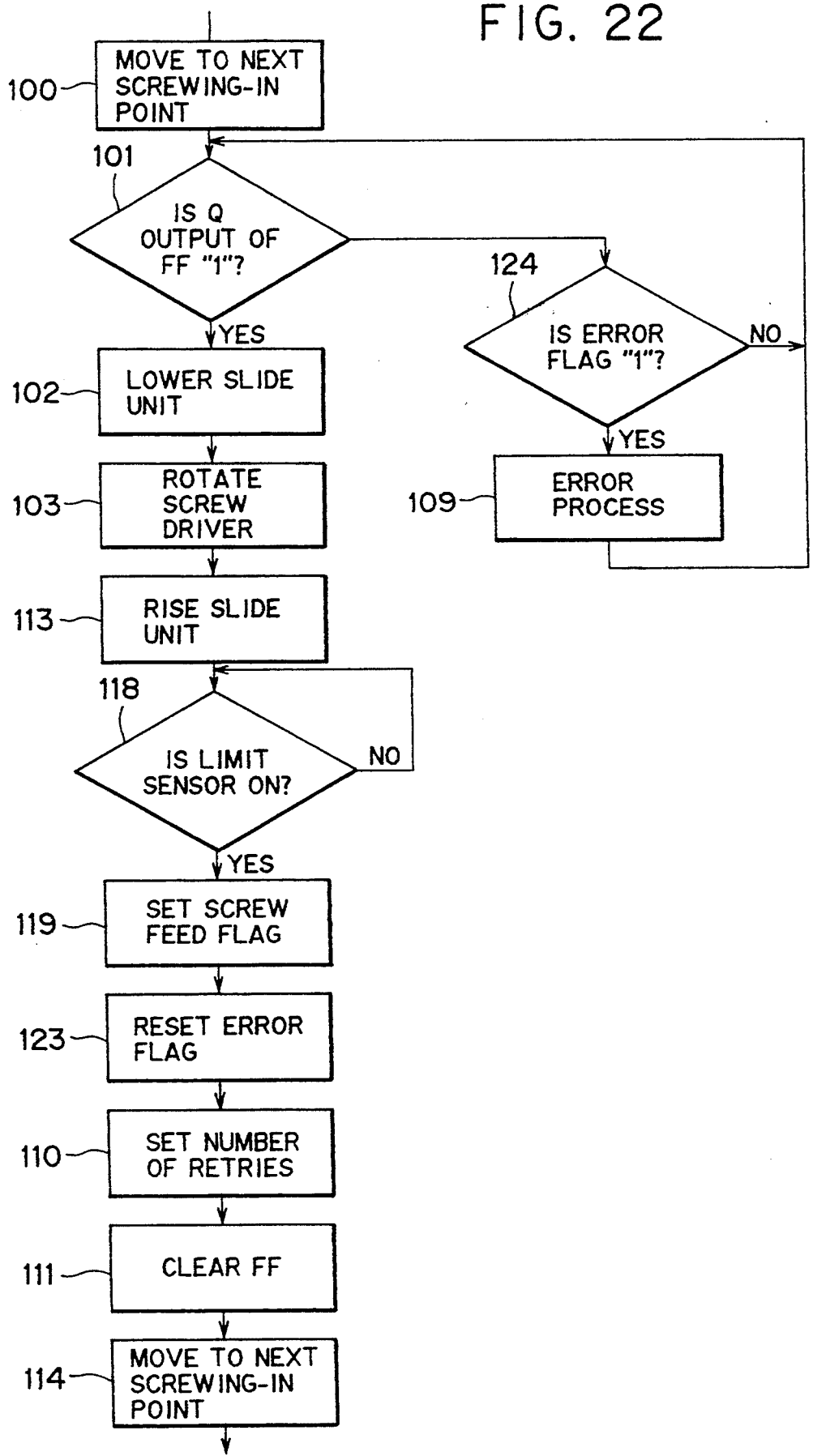
FIG. 22 is another modified operational sequence of the circuit shown in FIG. 19.

FIG. 22 is a flowchart showing a modified program that achieves the same results as in FIG. 20. However, in FIG. 22, initialization processes are executed after the limit sensor 46 goes on. The head 5 is then moved to the next screwing-in point in step 114.

Although the present invention has been described with respect to specific embodiments, it will be appreciated by one skilled in the art that a variety of changes and modifications may be made without departing from the scope of the invention. For example, in the various embodiments described above, monostable multivibrators are used as time measuring means. However, the time measurement can also be accomplished using an interrupt program wherein a memory timer is set up in the RAM 41 and activated by the CPU 38.

What is claimed is:

1. A screw supply control apparatus for sequentially supplying to a robot a plurality of screws, comprising:
    a screw feeder having a screw air-feed pipe through which the screws are air-fed to the robot, and an air-feed valve provided to said screw air-feed pipe wherein compressed air is fed into said screw air-feed pipe to air-feed the screw when said screw air-feed valve is open whereas compressed air is not fed into said screw air-feed pipe when said screw air-feed valve is closed;
    a screw passage sensor provided at said screw air-feed pipe for sensing passage of the screw and producing a passage signal when the passage of the screw is sensed;
    time measuring means for measuring a first predetermined period of time and producing a time-up signal when the first predetermined period of time is measured; and
    control means for controlling said air-feed valve to open in response to the passage signal and then to close said air-feed valve in response to the time-up signal wherein said time measuring means is controlled to start measurement of the first predetermined period of time when said screw passage sensor produces the passage signal.

2. The screw supply control apparatus according to claim 1, further comprising status checking means for checking an operational status of said air-feed valve and selectively producing an open signal indicative of opening of said air-feed valve and a close signal indicative of close of said air-feed valve, and retry means for performing a screw air-feed retry operation by opening said air-feed valve for a second predetermined period of time in the absence of the passage signal and when said status checking means produces the close signal.

3. The screw supply control apparatus according to claim 2, further comprising counting means for counting a number of the screw air-feed retry operations performed, and wherein said retry means repeats the screw air-feed retry operations until a count number in said counting means reaches a predetermined value.

4. An automatic screw tightening apparatus having a screw supply control apparatus and a screw tightening robot wherein a plurality of screws are sequentially supplied to the robot and the robot performs screwing-in operations to a workpiece, said apparatus comprising:
    screw holding means for holding a screw;
    a screw feeder having a screw air-feed pipe through which the screws are air-fed to said screw holding means, and an air-feed valve provided to said screw air-feed pipe wherein compressed air is fed into said screw air-feed pipe to air-feed the screw when said screw air-feed valve is open whereas compressed air is not fed into said screw air-feed pipe when said screw air-feed valve is closed;
    a screw driver having a drive bit;
    moving means for moving said drive bit toward and away from the workpiece, said drive bit receiving the screw held by said screw holding means for screwing into the workpiece as said drive bit moves toward the workpiece;
    a screw passage sensor provided at said screw air-feed pipe for sensing passage of the screw and producing a passage signal when the passage of the screw is sensed;
    time measuring means for measuring a first predetermined period of time and producing a time-up signal when the first predetermined period of time is measured; and
    control means for controlling said air-feed valve to open in response to the passage signal and then to close said air-feed valve in response to the time-up signal wherein said time measuring means is controlled to start measurement of the first predetermined period of time when said screw passage sensor produces the passage signal.

5. The screw supply control apparatus according to claim 4, further comprising status checking means for checking an operational status of said air-feed valve and selectively producing an open signal indicative of opening of said air-feed valve and a close signal indicative of close of said air-feed valve, and retry means for performing a screw air-feed retry operation by opening said air-feed valve for a second predetermined period of time in the absence of the passage signal and when said status checking means produces the close signal.

6. The screw supply control apparatus according to claim 5, further comprising counting means for counting a number of the screw air-feed retry operations performed, and wherein said retry means repeats the screw air-feed retry operations until a count number in said counting means reaches a predetermined value.

7. The screw supply control apparatus according to claim 4, wherein said control means comprises instruction means for instructing said moving means to move toward the workpiece when the passage signal is detected.

8. The screw supply control apparatus according to claim 4, further comprising detecting means for detecting that the screw is sufficiently screwed into the workpiece and producing a screwed-in signal.

9. A screw supply control apparatus for controlling screw-feed operations of a screw feeder which sequentially supplies to a robot a plurality of screws having a recessed head, the robot having a drive bit engageable with the recessed head for screwing the screws into a workpiece, a slide unit for moving the drive bit towards and away from the workpiece, and an electric driver for rotating the drive bit about its axis, the screw feeder having a screw air-feed pipe through which the screws pass from the screw feeder to the robot, a screw air-feed valve for selectively feeding compressed air into the screw air-feed pipe, the screw supply control apparatus comprising:

a screw passage sensor provided at the screw air-feed pipe, the screw passage sensor producing a passage signal that causes start of screwing-in operations;

detecting means for detecting when the screw is sufficiently screwed into the workpiece and producing a screwed-in signal;

controlling means for receiving the screwed-in signal and causing the slide unit to move away from the workpiece; and delay means for delaying the closing of the valve for a predetermined duration of time.

10. The screw supply control apparatus according to claim 9, wherein screwing-in operations include causing the slide unit to move toward the workpiece and the electric driver to rotate.

11. The screw supply control apparatus according to claim 9, wherein the screwed-in signal is determined by torque required to rotate the electric driver.

12. The screw supply control apparatus according to claim 9, wherein the screw air-feed valve opens so that a screw is supplied to the robot after the predetermined duration of time determined by the delay means is completed.

13. The screw supply control apparatus according to claim 12, wherein the screw air-feed valve opens after a fixed duration of time after the screwed-in signal is sent.

* * * * *